United States Patent
Halasa et al.

(10) Patent No.: US 6,329,467 B1
(45) Date of Patent: Dec. 11, 2001

(54) COUPLED RUBBERY POLYMERS

(75) Inventors: Adel Farhan Halasa, Bath; Wen-Liang Hsu, Cuyahoga Falls; Charles John Pearson, Akron, all of OH (US); Yi Feng, Corvallis, OR (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/467,861

(22) Filed: Dec. 20, 1999

Related U.S. Application Data

(60) Provisional application No. 60/154,674, filed on Sep. 17, 1999.

(51) Int. Cl.[7] .................................................... C08F 8/42

(52) U.S. Cl. ..................... 525/196; 525/192; 525/332.8; 525/332.9; 525/342

(58) Field of Search .................................. 525/192, 196, 525/332.8, 332.9, 342

(56) References Cited

U.S. PATENT DOCUMENTS

| | | | |
|---|---|---|---|
| 4,108,945 | * 8/1978 | Fetters et al. | 526/340 |
| 5,096,673 | 3/1992 | Herrmann et al. | 525/314 |
| 5,486,574 | 1/1996 | Himes et al. | 525/314 |
| 5,798,418 | * 8/1998 | Quirk | 525/314 |

* cited by examiner

*Primary Examiner*—Bernard Lipman
(74) *Attorney, Agent, or Firm*—Alvin T. Rockhill

(57) ABSTRACT

It has been unexpectedly found that greatly improved properties for tire rubbers, such as lower hysteresis, can be attained by coupling the rubber with both a tin halide, such as tin tetrachloride, and a silicon halide, such as silicon tetrachloride. Even better characteristics for use in tire tread compounds can be realized by asymmetrically coupling the rubbery polymer. This invention more specifically discloses a coupled rubbery polymer which is particularly valuable for use in manufacturing tire tread compounds, said coupled rubbery polymer being comprised of (1) tin atoms having at least three polydiene arms covalently bonded thereto and (2) silicon atoms having at least three polydiene arms covalently bonded thereto.

21 Claims, No Drawings

COUPLED RUBBERY POLYMERS

This application claims the benefit of U.S. Provisional Application Serial No. 60/154,674 filed on Sep. 17, 1999.

BACKGROUND OF THE INVENTION

Tire rubbers which are prepared by anionic polymerization are frequently coupled with a suitable coupling agent, such as a tin halide, to improve desired properties. Tin-coupled polymers are known to improve treadwear and to reduce rolling resistance when used in tire tread rubbers. Such tin-coupled rubbery polymers are typically made by coupling the rubbery polymer with a tin coupling agent at or near the end of the polymerization used in synthesizing the rubbery polymer. In the coupling process, live polymer chain ends react with the tin coupling agent thereby coupling the polymer. For instance, up to four live chain ends can react with tin tetrahalides, such as tin tetrachloride, thereby coupling the polymer chains together.

The coupling efficiency of the tin coupling agent is dependant on many factors, such as the quantity of live chain ends available for coupling and the quantity and type of polar modifier, if any, employed in the polymerization. For instance, tin coupling agents are generally not as effective in the presence of polar modifiers. The amount of coupling which is attained is also, of course, highly dependent upon the quantity of tin coupling agent employed.

Each tin tetrahalide molecule is capable of reacting with up to four live polymer chain ends. However, since perfect stoichiometry is difficult to attain, some of the tin halide molecules often react with less than four live polymer chain ends. For instance, if more than a stoichiometric amount of the tin halide coupling agent is employed, then there will be an insufficient quantity of live polymer chain ends to totally react with the tin halide molecules on a four-to-one basis. On the other hand, if less than a stoichiometric amount of the tin halide coupling agent is added, then there will be an excess of live polymer chain ends and some of the live chain ends will not be coupled.

Conventional tin coupling results in the formation of a coupled polymer which is essentially symmetrical. In other words, all of the polymer arms on the coupled polymer are of essentially the same chain length. All of the polymer arms in such conventional tin-coupled polymers are accordingly of essentially the same molecular weight. This results in such conventional tin-coupled polymers having a low polydispersity. For instance, conventional tin-coupled polymers normally having a ratio of weight average molecular weight to number average molecular weight which is within the range of about 1.01 to about 1.1.

U.S. Pat. No. 5,486,574 discloses dissimilar arm asymmetric radical or star block copolymers for adhesives and sealants. U.S. Pat. No. 5,096,973 discloses ABC block copolymers based on butadiene, isoprene and styrene and further discloses the possibility of branching these block copolymers with tetrahalides of silicon, germanium, tin or lead.

SUMMARY OF THE INVENTION

This invention is based upon the unexpected finding that greatly improved properties for tire rubbers, such as lower hysteresis, can be attained by coupling the rubber with both a tin halide and a silicon halide. For instance, such coupled polymers can be utilized in making tires having greatly improved rolling resistance without sacrificing other tire properties. These improved properties are due in part to better interaction and compatibility with carbon black. It is highly preferred for coupled polymer to be asymmetrically coupled with a tin halide and a silicon halide. Asymmetrical tin coupling also normally leads to improve the cold flow characteristics. Asymmetrical coupling in general also leads to better processability and other beneficial properties.

The coupled rubbery polymers of this invention are comprised of (1) tin atoms having at least three polydiene arms covalently bonded thereto and (2) silicon atoms having at least three polydiene arms covalently bonded thereto. It is highly preferred for the coupled rubbery polymer to be asymmetrically coupled wherein at least one of the polydiene arms bonded to the tin atoms has a number average molecular weight of less than about 40,000, wherein at least one of the polydiene arms bonded to the silicon atoms has a number average molecular weight of less than about 40,000, wherein at least one of said polydiene arms bonded to the tin atoms has a number average molecular weight of at least about 80,000, wherein at least one of said polydiene arms bonded to the silicon atoms has a number average molecular weight of at least about 80,000 and wherein the ratio of the weight average molecular weight to the number average molecular weight of the asymmetrically tin-coupled rubbery polymer is within the range of about 2 to about 2.5.

This invention more specifically discloses a coupled rubbery polymer which is particularly valuable for use in manufacturing tire tread compounds, said coupled rubbery polymer being comprised of (1) tin atoms having at least three polydiene arms covalently bonded thereto and (2) silicon atoms having at least three polydiene arms covalently bonded thereto.

The subject invention further discloses an asymmetrical tin-coupled rubbery polymer which is particularly valuable for use in manufacturing tire tread compounds, said asymmetrical tin-coupled rubbery polymer being comprised of (1) tin atoms having at least three polydiene arms covalently bonded thereto, wherein at least one of said polydiene arms bonded to the tin atoms has a number average molecular weight of less than about 40,000, wherein at least one of said polydiene arms bonded to the tin atoms has a number average molecular weight of at least about 80,000 and (2) silicon atoms having at least three polydiene arms covalently bonded thereto, wherein at least one of said polydiene arms bonded to the silicon atoms has a number average molecular weight of less than about 40,000, wherein at least one of said polydiene arms bonded to the silicon atoms has a number average molecular weight of at least about 80,000 and wherein the ratio of the weight average molecular weight to the number average molecular weight of the asymmetrical coupled rubbery polymer is within the range of about 2 to about 2.5.

This invention also reveals a process for preparing an asymmetrical coupled rubbery polymer which comprises: (1) continuously polymerizing at least one diene monomer to a conversion of at least about 90 percent utilizing an anionic initiator to produce a polymer cement containing living polydiene rubber chains, wherein some of the living polydiene rubber chains are low molecular weight polydiene rubber chains having a number average molecular weight of less than about 40,000 and wherein some of the living polydiene rubber chains are high molecular weight polydiene rubber chains having a number average molecular weight of greater than about 80,000; and (2) continuously adding a tin halide and a silicon halide to the polymer cement in a separate reaction vessel to produce the asymmetrically coupled rubbery polymer, wherein said asymmetrical coupled rubbery polymer has a polydispersity which is within the range of about 2 to about 2.5.

The stability of the asymmetrical tin-coupled rubbery polymers of this invention can be improved by adding a tertiary chelating amine or a salt of a cyclic alcohol thereto subsequent to the time at which the tin-coupled rubbery polymer is coupled. Sodium mentholate is a representative example of a salt of a cyclic alcohol which is preferred for utilization in stabilizing the coupled rubbery polymers of this invention.

DETAILED DESCRIPTION OF THE INVENTION

Virtually any type of rubbery polymer prepared by anionic polymerization can be coupled in accordance with this invention. In fact, the techniques of this invention can be used to asymmetrically couple virtually any type of rubbery polymer synthesized by anionic polymerization. The rubbery polymers which can be asymmetrically coupled will typically be synthesized by a solution polymerization technique utilizing an organolithium compound as the initiator. These rubbery polymers will accordingly normally contain a "living" lithium chain end.

The polymerizations employed in synthesizing the living rubbery polymers will normally be carried out in a hydrocarbon solvent which can be one or more aromatic, paraffinic or cycloparaffinic compounds. These solvents will normally contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture.

In the solution polymerization, there will normally be from 5 to 30 weight percent monomers in the polymerization medium. Such polymerization media are, of course, comprised of the organic solvent and monomers. In most cases, it will be preferred for the polymerization medium to contain from 10 to 25 weight percent monomers. It is generally more preferred for the polymerization medium to contain 15 to 20 weight percent monomers.

The rubbery polymers which are coupled in accordance with this invention can be made by the homopolymerization of a conjugated diolefin monomer or by the random copolymerization of a conjugated diolefin monomer with a vinyl aromatic monomer. It is, of course, also possible to make living rubbery polymers which can be coupled by polymerizing a mixture of conjugated diolefin monomers with one or more ethylenically unsaturated monomers, such as vinyl aromatic monomers. The conjugated diolefin monomers which can be utilized in the synthesis of rubbery polymers which can be coupled in accordance with this invention generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Some representative examples of ethylenically unsaturated monomers that can potentially be synthesized into rubbery polymers which can be asymmetrically tin-coupled in accordance with this invention include alkyl acrylates, such as methyl acrylate, ethyl acrylate, butyl acrylate, methyl methacrylate, and the like; vinylidene monomers having one or more terminal $CH_2=CH-$ groups; vinyl aromatics, such as styrene, α-methylstyrene, bromostyrene, chlorostyrene, fluorostyrene, and the like; α-olefins such as ethylene, propylene, 1-butene, and the like; vinyl halides, such as vinylbromide, chloroethane (vinylchloride), vinylfluoride, vinyliodide, 1,2-dibromoethene, 1,1-dichloroethene (vinylidene chloride), 1,2-dichloroethene, and the like; vinyl esters, such as vinyl acetate; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide, and the like.

Rubbery polymers which are copolymers of one or more diene monomers with one or more other ethylenically unsaturated monomers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubbers which contain from 50 to 95 weight percent conjugated diolefin monomers and from 5 to 50 weight percent vinylaromatic monomers, are useful in many applications.

Vinyl aromatic monomers are probably the most important group of ethylenically unsaturated monomers which are commonly incorporated into polydienes. Such vinyl aromatic monomers are, of course, selected so as to be copolymerizable with the conjugated diolefin monomers being utilized. Generally, any vinyl aromatic monomer which is known to polymerize with organolithium initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 1-vinylnaphthalene, 2-vinylnaphthalene, α-methylstyrene, 4-phenylstyrene, 3-methylstyrene, and the like.

Some representative examples of rubbery polymers which can be asymmetrically tin-coupled in accordance with this invention include polybutadiene, polyisoprene, styrene-butadiene rubber (SBR), α-methylstyrene-butadiene rubber, α-methylstyrene-isoprene rubber, styrene-isoprene-butadiene rubber (SIBR), styrene-isoprene rubber (SIR), isoprene-butadiene rubber (IBR), α-methylstyrene-isoprene-butadiene rubber and α-methylstyrene-styrene-isoprene-butadiene rubber. In cases where the rubbery polymer is comprised of repeat units that are derived from two or more monomers, the repeat units which are derived from the different monomers will normally be distributed in an essentially random manner. In other words, the rubbery polymer will not be a block copolymer.

The polymerizations employed in making the rubbery polymer are typically initiated by adding an organolithium initiator to an organic polymerization medium which contains the monomers. Such polymerizations are typically carried out utilizing continuous polymerization techniques. In such continuous polymerizations, monomers and initiator are continuously added to the organic polymerization medium with the rubbery polymer synthesized being continuously withdrawn. Such continuous polymerizations are typically conducted in a multiple reactor system.

The organolithium initiators which can be employed in synthesizing rubbery polymers which can be coupled in accordance with this invention include the monofunctional and multifunctional types known for polymerizing the monomers described herein. The multifunctional organolithium initiators can be either specific organolithium compounds or can be multifunctional types which are not necessarily specific compounds but rather represent reproducible compositions of regulable functionality.

The amount of organolithium initiator utilized will vary with the monomers being polymerized and with the molecular weight that is desired for the polymer being synthesized. However, as a general rule, from 0.01 to 1 phm (parts per 100 parts by weight of monomer) of an organolithium initiator will be utilized. In most cases, from 0.01 to 0.1 phm of an organolithium initiator will be utilized with it being preferred to utilize 0.025 to 0.07 phm of the organolithium initiator.

The choice of initiator can be governed by the degree of branching and the degree of elasticity desired for the polymer, the nature of the feedstock, and the like. With regard to the feedstock employed as the source of conjugated diene, for example, the multifunctional initiator types generally are preferred when a low concentration diene stream is at least a portion of the feedstock, since some components present in the unpurified low concentration diene stream may tend to react with carbon lithium bonds to deactivate initiator activity, thus necessitating the presence of sufficient lithium functionality in the initiator so as to override such effects.

The multifunctional initiators which can be used include those prepared by reacting an organomonolithium compounded with a multivinylphosphine or with a multivinylsilane, such a reaction preferably being conducted in an inert diluent such as a hydrocarbon or a mixture of a hydrocarbon and a polar organic compound. The reaction between the multivinylsilane or multivinylphosphine and the organomonolithium compound can result in a precipitate which can be solubilized, if desired, by adding a solubilizing monomer such as a conjugated diene or monovinyl aromatic compound, after reaction of the primary components. Alternatively, the reaction can be conducted in the presence of a minor amount of the solubilizing monomer. The relative amounts of the organomonolithium compound and the multivinylsilane or the multivinylphosphine preferably should be in the range of about 0.33 to 4 moles of organomonolithium compound per mole of vinyl groups present in the multivinylsilane or multivinylphosphine employed. It should be noted that such multifunctional initiators are commonly used as mixtures of compounds rather than as specific individual compounds.

Exemplary organomonolithium compounds include ethyllithium, isopropyllithium, n-butyllithium, sec-butyllithium, tert-octyllithium, n-eicosyllithium, phenyllithium, 2-naphthyllithium, 4-butylphenyllithium, 4-tolyllithium, 4-phenylbutyllithium, cyclohexyllithium, and the like.

Exemplary multivinylsilane compounds include tetravinylsilane, methyltrivinylsilane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and the like.

Exemplary multivinylphosphine compounds include trivinylphosphine, methyldivinylphosphine, dodecyldivinylphosphine, phenyldivinylphosphine, cyclooctyldivinylphosphine, and the like.

Other multifunctional polymerization initiators can be prepared by utilizing an organomonolithium compound, further-together with a multivinylaromatic compound and either a conjugated diene or monovinylaromatic compound or both. These ingredients can be charged initially, usually in the presence of a hydrocarbon or a mixture of a hydrocarbon and a polar organic compound as a diluent. Alternatively, a multifunctional polymerization initiator can be prepared in a two-step process by reacting the organomonolithium compound with a conjugated diene or monovinyl aromatic compound additive and then adding the multivinyl aromatic compound. Any of the conjugated dienes or monovinyl aromatic compounds described can be employed. The ratio of conjugated diene or monovinyl aromatic compound additive employed preferably should be in the range of about 2 to 15 moles of polymerizable compound per mole of organolithium compound. The amount of multivinylaromatic compound employed preferably should be in the range of about 0.05 to 2 moles per mole of organomonolithium compound.

Exemplary multivinyl aromatic compounds include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and the like. Divinyl aromatic hydrocarbons containing up to 18 carbon atoms per molecule are preferred, particularly divinylbenzene as either the ortho, meta or para isomer and commercial divinylbenzene, which is a mixture of the three isomers, and other compounds, such as the ethylstyrenes, also is quite satisfactory.

Other types of multifunctional initiators can be employed such as those prepared by contacting a sec- or tert-organomonolithium compound with 1,3-butadiene, at a ratio of about 2 to 4 moles of the organomonolithium compound per mole of the 1,3-butadiene, in the absence of added polar material in this instance, with the contacting preferably being conducted in an inert hydrocarbon diluent, though contacting without the diluent can be employed if desired.

Alternatively, specific organolithium compounds can be employed as initiators, if desired, in the preparation of polymers in accordance with the present invention. These can be represented by R(Li)x wherein R represents a hydrocarbyl radical containing from 1 to 20 carbon atoms, and wherein x is an integer of 1 to 4. Exemplary organolithium compounds are methyllithium, isopropyllithium, n-butyllithium, sec-butyllithium, tert-octyllithium, n-decyllithium, phenyllithium, 1-naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like.

The polymerization temperature utilized can vary over a broad range of from about −20° C. to about 180° C. In most cases, a temperature within the range of about 30° C. to about 125° C. will be utilized. It is typically preferred for the polymerization temperature to be within the range of about 45° C. to about 100° C. It is typically most preferred for the polymerization temperature to be within the range of about 60° C. to about 85° C. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions are attained. The polymerization is then terminated by the addition of a tin halide and a silicon halide. The tin halide and the silicon halide are continuously added in cases where asymmetrical coupling is desired. This continuous addition of tin coupling agent and the silicon coupling agent is normally done in a reaction zone separate from the zone where the bulk of the polymerization is occurring. In other words, the tin coupling agent and the silicon coupling agent will typically be added only after a high degree of conversion has already been attained. For instance, the tin coupling agent and the silicon coupling agent will normally be added only after a monomer conversion of greater than about 90 percent has been realized. It will typically be preferred for the monomer conversion to reach at least about 95 percent before the tin coupling agent and the silicon coupling agent are added. As a general rule, it is most preferred for the monomer conversion to exceed about 98 percent before the coupling agents are added. The coupling agents will normally be added in a separate reaction vessel after the desired degree of conversion has been attained. The coupling agents can be added in a hydrocarbon solution, e.g., in cyclohexane, to the polymerization admixture with suitable mixing for distribution and reaction.

The tin coupling agent will normally be a tin tetrahalide, such as tin tetrachloride, tin tetrabromide, tin tetrafluoride or tin tetraiodide. However, tin trihalides can also optionally be used. Polymers coupled with tin trihalides having a maximum of three arms. This is, of course, in contrast to polymers coupled with tin tetrahalides which have a maximum of four arms. To induce a higher level of branching, tin tetrahalides are normally preferred. As a general rule, tin tetrachloride is most preferred.

The silicon coupling agent will normally be a silicon tetrahalide, such as silicon tetrachloride, silicon tetrabromide, silicon tetrafluoride or silicon tetraiodide. However, silicon trihalides can also optionally be used. Polymers coupled with silicon trihalides having a maximum of three arms. This is, of course, in contrast to polymers coupled with silicon tetrahalides which have a maximum of four arms. To induce a higher level of branching, silicon tetrahalides are normally preferred. As a general rule, silicon tetrachloride is most preferred.

The molar ratio of the tin halide to the silicon halide employed in coupling the rubbery polymer will normally be within the range of 20:80 to 95:5. The molar ratio of the tin halide to the silicon halide employed in coupling the rubbery polymer will more typically be within the range of 40:60 to 90:10. The molar ratio of the tin halide to the silicon halide employed in coupling the rubbery polymer will preferably be within the range of 60:40 to 85:15. The molar ratio of the tin halide to the silicon halide employed in coupling the rubbery polymer will most preferably be within the range of 65:35 to 80:20.

Broadly, and exemplary, a range of about 0.01 to 4.5 milliequivalents of tin coupling agent (tin halide and silicon halide) is employed per 100 grams of the rubbery polymer. It is normally preferred to utilize about 0.01 to about 1.5 milliequivalents of the coupling agent per 100 grams of polymer to obtain the desired Mooney viscosity. The larger quantities tend to result in production of polymers containing terminally reactive groups or insufficient coupling. One equivalent of tin coupling agent per equivalent of lithium is considered an optimum amount for maximum branching. For instance, if a mixture tin tetrahalide and silicon tetrahalide is used as the coupling agent, one mole of the coupling agent would be utilized per four moles of live lithium ends. In cases where a mixture of tin trihalide and silicon trihalide is used as the coupling agent, one mole of the coupling agent will optimally be utilized for every three moles of live lithium ends. The coupling agent can be added in a hydrocarbon solution, e.g., in cyclohexane, to the polymerization admixture in the reactor with suitable mixing for distribution and reaction.

After the coupling has been completed, a tertiary chelating alkyl 1,2-ethylene diamine or a metal salt of a cyclic alcohol can optionally be added to the polymer cement to stabilize the coupled rubbery polymer. The tertiary chelating amines which can be used are normally chelating alkyl diamines of the structural formula:

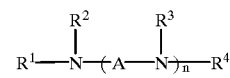

wherein n represents an integer from 1 to about 6, wherein A represents an alkylene group containing from 1 to about 6 carbon atoms and wherein $R^1$, $R^2$, $R^3$ and $R^4$ can be the same or different and represent alkyl groups containing from 1 to about 6 carbon atoms. The alkylene group A is the formula $-(CH_2)_m-$ wherein m is an integer from 1 to about 6. The alkylene group will typically contain from 1 to 4 carbon atoms (m will be 1 to 4) and will preferably contain 2 carbon atoms. In most cases, n will be an integer from 1 to about 3 with it being preferred for n to be 1. It is preferred for $R^1$, $R^2$, $R^3$ and $R^4$ to represent alkyl groups which contain from 1 to 3 carbon atoms. In most cases, $R^1$, $R^2$, $R^3$ and $R^4$ will represent methyl groups.

The metal salts of the cyclic alcohols that can be used will typically be a Group Ia metal salts. Lithium, sodium, potassium, rubidium and cesium salts are representative examples of such salts with lithium, sodium and potassium salts being preferred. Sodium salts are typically the most preferred. The cyclic alcohol can be mono-cyclic, bi-cyclic or tri-cyclic and can be aliphatic or aromatic. They can be substituted with 1 to 5 hydrocarbon moieties and can also optionally contain hetero-atoms. For instance, the metal salt of the cyclic alcohol can be a metal salt of a di-alkylated cyclohexanol, such as 2-isopropyl-5-methylcyclohexanol or 2-t-butyl-5-methylcyclohexanol. These salts are preferred because they are soluble in hexane. Metal salts of disubstituted cyclohexanol are highly preferred because they are soluble in hexane. Sodium mentholate is the most highly preferred metal salt of a cyclic alcohol that can be employed in the practice of this invention. Metal salts of thymol can also be utilized. The metal salt of the cyclic alcohol can be prepared by reacting the cyclic alcohol directly with the metal or another metal source, such as sodium hydride, in an aliphatic or aromatic solvent.

A sufficient amount of the chelating amine or metal salt of the cyclic alcohol should be added to complex with any residual tin coupling agent remaining after completion of the coupling reaction.

In most cases, from about 0.01 phr (parts by weight per 100 parts by weight of dry rubber) to about 2 phr of the chelating alkyl 1,2-ethylene diamine or metal salt of the cyclic alcohol will be added to the polymer cement to stabilize the rubbery polymer. Typically, from about 0.05 phr to about 1 phr of the chelating alkyl 1,2-ethylene diamine or metal salt of the cyclic alcohol will be added. More typically, from about 0.1 phr to about 0.6 phr of the chelating alkyl 1,2-ethylene diamine or the metal salt of the cyclic alcohol will be added to the polymer cement to stabilize the rubbery polymer.

After the polymerization, coupling and, optionally, the stabilization step has been completed, the coupled rubbery polymer can be recovered from the organic solvent. The coupled rubbery polymer can be recovered from the organic solvent and residue by means such as decantation, filtration, centrification, and the like. It is often desirable to precipitate the coupled rubbery polymer from the organic solvent by the addition of lower alcohols containing from about 1 to about 4 carbon atoms to the polymer solution. Suitable lower alcohols for precipitation of the rubber from the polymer cement include methanol, ethanol, isopropyl alcohol, normal-propyl alcohol and t-butyl alcohol. The utilization of lower alcohols to precipitate the asymmetrically tin-coupled rubbery polymer from the polymer cement also "kills" any remaining living polymer by inactivating lithium end groups. After the coupled rubbery polymer is recovered from the solution, steam-stripping can be employed to reduce the level of volatile organic compounds in the coupled rubbery polymer.

The coupled rubbery polymers that can be made by using the technique of this invention are comprised of tin atoms having at least three polydiene arms covalently bonded thereto and silicon atoms having at least three polydiene arms covalently bonded thereto. In the case of asymmetrically coupled rubbery polymers made by the technique of this invention, at least one of the polydiene arms bonded to the tin atoms has a number average molecular weight of less than about 40,000, at least one of the polydiene arms bonded to the tin atom has a number average molecular weight of at least about 80,000, at least one of the polydiene arms bonded to the silicon atoms has a number average molecular weight of less than about 40,000 and at least one of the polydiene arms bonded to the silicon atoms has a number average molecular weight of at least about 80,000. The ratio of the weight average molecular weight to the number average molecular weight of the asymmetrically coupled rubbery polymer will also be within the range of about 2 to about 2.5.

The asymmetrically coupled rubbery polymers of this invention contain stars of the structural formula:

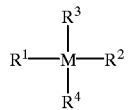

wherein M represents silicon or tin, wherein $R^1$, $R^2$, $R^3$ and $R^4$ can be the same or different and are selected from the group consisting of alkyl groups and polydiene arms (polydiene rubber chains), with the proviso that at least three members selected from the group consisting of $R^1$, $R^2$, $R^3$ and $R^4$ are polydiene arms, with the proviso that at least one member selected from the group consisting of $R^1$, $R^2_1$, $R^3$ and $R^4$ is a low molecular weight polydiene arm having a number average molecular weight of less than about 40,000, with the proviso that at least one member selected from the group consisting of $R^1$, $R^2$, $R^3$ and $R^4$ is a high molecular weight polydiene arm having a number average molecular weight of greater than about 80,000 and with the proviso that the ratio of the weight average molecular weight to the number average molecular weight of the asymmetrical tin-coupled rubbery polymer is within the range of about 2 to about 2.5. It should be noted that $R^1$, $R^2$, $R^3$ and $R^4$ can be alkyl groups because it is possible for the tin halide coupling agent to react directly with alkyl lithium compounds which are used as the polymerization initiator. The ratio of silicon containing stars to tin containing stars will be within the range of about 20:80 to about 80:20.

In most cases, four polydiene arms will be covalently bonded to the tin atom or the silicon atom in the asymmetrical tin-coupled rubbery polymer. In such cases, $R^1$, $R^2$, $R^3$ and $R^4$ will all be polydiene arms. The asymmetrical tin-coupled rubbery polymer will often contain a polydiene arm of intermediate molecular weight as well as the low molecular weight arm and the high molecular weight arm. Such intermediate molecular weight arms will have a molecular weight which is within the range of about 45,000 to about 75,000. It is normally preferred for the low molecular polydiene arm to have a molecular weight of less than about 30,000 with it being most preferred for the low molecular weight arm to have a molecular weight of less than about 25,000. It is normally preferred for the high molecular polydiene arm to have a molecular weight of greater than about 90,000 with it being most preferred for the high molecular weight arm to have a molecular weight of greater than about 100,000. The arms of the coupled polymer will typically be either homopolymers or random copolymers. In other words, the arms of the coupled polymers will normally not be block copolymers.

This invention is illustrated by the following examples which are merely for the purpose of illustration and are not to be regarded as limiting the scope of the invention or the manner in which it can be practiced. Unless specifically indicated otherwise, parts and percentages are given by weight.

Benefits with tin-coupled IBRs, as compared to the linear IBRs, are demonstrated by the following examples. These benefits include:

(1) Improvements in processability, particularly extrudability/extrudate quality.

(2) Treadwear improvement and rolling resistance reduction due to improved carbon black dispersion with the tin-coupled IBR. Good dispersion of carbon black prevents carbon particles from forming a network of carbon black in the vulcanizate and reduces hysteresis resulting from carbon black aggregates. This is known as Payne effect. The higher the Payne effect, the better the carbon black dispersion. The Payne effect can be measured as follows:

$$Payne\ effect = \frac{G'\ at\ 10\%\ strain}{G'\ at\ 1\%\ strain} \times 100$$

EXAMPLE 1

In this experiment, a tin-coupled isoprene-butadiene rubber was prepared at 70° C. In the procedure used, 2300 g of a silica/alumina/molecular sieve dried premix containing 19.5 weight percent isoprene/1,3-butadiene mixture in hexanes was charged into a one-gallon (3.8 liters) reactor. The ratio of isoprene to 1,3-butadiene was 30:70. After the amount of impurity in the premix was determined, 4.50 ml of 1.04 M solution of n-butyllithium (in hexanes) was added to the reactor. The target Mn (number averaged molecular weight) was 100,000. The polymerization was allowed to proceed at 70° C. for 4 hours. The GC analysis of the residual monomers contained in the polymerization mixture indicated that most of the monomers were converted to polymer. After a small aliquot of polymer cement was removed from the reactor (for analysis), 2.0 ml of a 0.6 M solution of tin tetrachloride (in hexanes) was added to the reactor and the coupling reaction was carried out the same temperature for one hour. At that time, 1.0 phr (parts per 100 parts of rubber by weight) of BHT (2,6-di-tert-butyl-4-methylphenol) was added to the reactor to shortstop the polymerization and to stabilize the polymer. After evaporating the hexanes, the resulting polymer was dried in a vacuum oven at 50° C. The coupled isoprene-butadiene rubber (IBR) produced was determined to have a glass transition temperature (Tg) at −89° C. It was also determined to have a microstructure which contained 5.7 percent 1,2-polybutadiene units, 64.6 percent 1,4-polybutadiene units, 28.5 percent 1,4-polyisoprene and 1.2 percent 3,4-polyisoprene. The Mooney viscosity (ML-4) at 100° C. for this coupled polymer was also determined to be 80. Based on GPC measurement, the coupling efficiency was 90 percent.

EXAMPLES 2–5

The product described in Example 1 was utilized in these experiments, except that a mixture of tin tetrachloride and silicon tetrachloride was used as the coupling agent. The molar ratios of tin tetrachloride to silicon tetrachloride in these mixtures were 85:15, 75:25, 65:35 and 55:45. The Mooney viscosities and microstructures of these IBRs are shown in Table I. The coupling efficiency for all these IBRs were 90 percent, based on GPC measurement, and the glass transition temperature of all of the polymers made was −89° C.

TABLE I

| Ex. | Sn/Si | ML-4 | 1,2-PBd | 1,4-PBd | 1,4-PI | 3,4-PI |
|---|---|---|---|---|---|---|
| 1 | 100/0 | 80 | 5.7% | 64.6% | 28.5% | 1.2% |
| 2 | 85/15 | 85 | 5.6% | 64.7% | 28.5% | 1.2% |
| 3 | 75/25 | 87 | 5.6% | 64.7% | 28.5% | 1.2% |
| 4 | 65/35 | 86 | 5.7% | 64.6% | 28.4% | 1.3% |
| 5 | 55/45 | 83 | 5.7% | 64.4% | 28.6% | 1.3% |

EXAMPLE 6

The coupled IBRs made in Examples 1–5 were compounded in a model formulation by mixing them with the ingredients shown in Table II. The tan delta valued at 11 Hz at varied temperatures and stains are reported in Table III. As indicated in Table III, the polymer made in Example 3, which utilized a 75:25 mixture of tin tetrachloride to silicon tetrachloride as the coupling agent, exhibited the lowest tan delta values at 40–100° C. at all strain levels. This indicates that it will have the lowest compound hysteresis when used as a tire tread compound.

TABLE II

| Materials | phr |
|---|---|
| polymer | 100 |
| carbon black | 40 |
| process oil | 4 |
| wax | 2 |
| stearic acid | 1.5 |
| zinc oxide | 3 |
| antioxidant | 1 |
| accelerator | 0.11 |
| curative | 1.3 |
| sulfur | 1.3 |

TABLE III

| | Tan Delta Values | | | | |
|---|---|---|---|---|---|
| Temp & Strain | 1 | 2 | 3 | 4 | 5 |
| 40° C. @ 1% strain | .080 | .084 | .072 | .077 | .085 |
| 100° C. @ 5% strain | .075 | .074 | .066 | .068 | .082 |
| 100° C. @ 50% strain | .060 | .058 | .055 | .056 | .062 |

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A coupled rubbery polymer which is particularly valuable for use in manufacturing tire tread compounds, said coupled rubbery polymer being comprised of (1) tin atoms having at least three polydiene arms covalently bonded thereto and (2) silicon atoms having at least three polydiene arms covalently bonded thereto.

2. An asymmetrical tin-coupled rubbery polymer which is particularly valuable for use in manufacturing tire tread compounds, said asymmetrical tin-coupled rubbery polymer being comprised of (1) tin atoms having at least three polydiene arms covalently bonded thereto, wherein at least one of said polydiene arms bonded to the tin atoms has a number average molecular weight of less than about 40,000, wherein at least one of said polydiene arms bonded to the tin atoms has a number average molecular weight of at least about 80,000 and (2) silicon atoms having at least three polydiene arms covalently bonded thereto, wherein at least one of said polydiene arms bonded to the silicon atoms has a number average molecular weight of less than about 40,000, wherein at least one of said polydiene arms bonded to the silicon atoms has a number average molecular weight of at least about 80,000 and wherein the ratio of the weight average molecular weight to the number average molecular weight of the asymmetrical coupled rubbery polymer is within the range of about 2 to about 2.5.

3. A process for preparing an asymmetrically coupled rubbery polymer which comprises: (1) continuously polymerizing at least one diene monomer to a conversion of at least about 90 percent utilizing an anionic initiator to produce a polymer cement containing living polydiene rubber chains, wherein some of the living polydiene rubber chains are low molecular weight polydiene rubber chains having a number average molecular weight of less than about 40,000 and wherein some of the living polydiene rubber chains are high molecular weight polydiene rubber chains having a number average molecular weight of greater than about 80,000; and (2) continuously adding a tin halide and a silicon halide to the polymer cement in a separate reaction vessel to produce the asymmetrically coupled rubbery polymer, wherein said asymmetrical coupled rubbery polymer has a polydispersity which is within the range of about 2 to about 2.5.

4. An asymmetrically coupled rubbery polymer as specified in claim 2 wherein the polydiene arms are comprised of a member selected from the group consisting of polybutadiene chains, polyisoprene chains, styrene-butadiene chains, α-methylstyrene-butadiene chains, α-methylstyrene-isoprene chains, styrene-isoprene-butadiene chains, styrene-isoprene chains, isoprene-butadiene chains, α-methylstyrene-isoprene-butadiene chains and α-methylstyrene-styrene-isoprene-butadiene chains.

5. An asymmetrically coupled rubbery polymer as specified in claim 4 wherein four polydiene arms are covalently bonded to the tin atoms and the silicon atoms.

6. An asymmetrically coupled rubbery polymer as specified in claim 5 wherein at least one of the polydiene arms covalently bonded to the tin atoms is of an intermediate number average molecular weight which is within the range of about 45,000 to about 75,000, and wherein at least one of the polydiene arms covalently bonded to the silicon atoms is of an intermediate number average molecular weight which is within the range of about 45,000 to about 75,000.

7. An asymmetrically coupled rubbery polymer as specified in claim 6 wherein at least one of the polydiene arms covalently bonded to the tin atoms has a number average molecular weight of less than about 30,000 and wherein at least one of the polydiene arms covalently bonded to the silicon atoms has a number average molecular weight of less than about 30,000.

8. An asymmetrically coupled rubbery polymer as specified in claim 7 wherein at least one of the polydiene arms covalently bonded to the tin atoms has a number average molecular weight of greater than about 90,000 and wherein at least one of the polydiene arms covalently bonded to the silicon atoms has a number average molecular weight of greater than about 90,000.

9. An asymmetrically coupled rubbery polymer as specified in claim 8 wherein at least one of the polydiene arms covalently bonded to the tin atoms has a number average molecular weight of less than about 25,000 and wherein at least one of the polydiene arms covalently bonded to the silicon atoms has a number average molecular weight of less than about 25,000.

10. An asymmetrically coupled rubbery polymer as specified in claim 9 wherein at least one of the polydiene arms covalently bonded to the tin atoms has a number average molecular weight of greater than about 100,000 and wherein at least one of the polydiene arms covalently bonded to the silicon atoms has a number average molecular weight of greater than about 100,000.

11. An asymmetrically coupled rubbery polymer as specified in claim 8 wherein said polydiene arms are isoprene-butadiene chains.

12. An asymmetrically coupled rubbery polymer as specified in claim 8 wherein said polydiene arms are isoprene chains.

13. An asymmetrically coupled rubbery polymer as specified in claim 8 wherein said polydiene arms are butadiene chains.

14. An asymmetrically coupled rubbery polymer as specified in claim 8 wherein said polydiene arms are styrene-isoprene-butadiene chains.

15. An asymmetrically coupled polymer as specified in claim 2 wherein the molar ratio of tin to silicon is within the range of about 20:80 to about 95:5.

16. An asymmetrically coupled polymer as specified in claim 5 wherein the molar ratio of tin to silicon is within the range of about 40:60 to about 90:10.

17. An asymmetrically coupled polymer as specified in claim 7 wherein the molar ratio of tin to silicon is within the range of about 60:40 to about 85:15.

18. An asymmetrically coupled polymer as specified in claim 10 wherein the molar ratio of tin to silicon is within the range of about 65:35 to about 80:20.

19. A process as specified in claim 3 wherein the anionic initiator is an organolithium compound, wherein the tin halide is a tin tetrahalide and wherein the silicon halide is silicon tetrachloride.

20. A process as specified in claim 19 wherein the polymer cement further contains intermediate molecular weight living polydiene rubber chains having a number average molecular weight which is within the range of about 45,000 to about 75,000.

21. A process as specified in claim 20 wherein the low molecular weight polydiene chains have a number average molecular weight of less than about 30,000 and wherein the high molecular weight polydiene chains have a number average molecular weight of greater than about 90,000.

* * * * *